United States Patent
Chen et al.

[11] Patent Number: 5,985,474
[45] Date of Patent: Nov. 16, 1999

[54] INTEGRATED FULL PROCESSOR, FURNACE, AND FUEL CELL SYSTEM FOR PROVIDING HEAT AND ELECTRICAL POWER TO A BUILDING

[75] Inventors: Jeffrey S. Chen, Albany; Wenhua Huang, Latham; William P. Acker, Rexford, all of N.Y.

[73] Assignee: Plug Power, L.L.C., Latham, N.Y.

[21] Appl. No.: 09/140,373

[22] Filed: Aug. 26, 1998

[51] Int. Cl.⁶ .................................................. H01M 8/06
[52] U.S. Cl. ............................ 429/17; 429/20; 429/22; 429/24; 429/26
[58] Field of Search ............................ 429/17, 20, 22, 429/24, 26

[56] References Cited

U.S. PATENT DOCUMENTS

| | | | |
|---|---|---|---|
| 4,087,976 | 5/1978 | Morrow, Jr. et al. | 60/643 |
| 4,120,787 | 10/1978 | Yargeau | 210/26 |
| 4,644,751 | 2/1987 | Hsu | 60/676 |
| 4,670,359 | 6/1987 | Beshty et al. | 429/17 |
| 4,696,871 | 9/1987 | Pinto | 429/17 |
| 5,149,600 | 9/1992 | Yamase et al. | 429/20 X |
| 5,312,699 | 5/1994 | Yanagi et al. | 429/22 |
| 5,335,628 | 8/1994 | Dunbar | 122/1 R |
| 5,360,679 | 11/1994 | Buswell et al. | 429/19 |
| 5,401,589 | 3/1995 | Palmer et al. | 429/13 |
| 5,432,710 | 7/1995 | Ishimaru et al. | 364/493 |
| 5,648,182 | 7/1997 | Hara et al. | 429/20 |
| 5,693,201 | 12/1997 | Hsu et al. | 204/241 |
| 5,714,276 | 2/1998 | Okamoto | 429/17 |
| 5,837,393 | 11/1998 | Okamoto | 429/20 |
| 5,840,437 | 11/1998 | Diethelm | 429/20 X |

FOREIGN PATENT DOCUMENTS 60-158561  8/1995  Japan.

OTHER PUBLICATIONS

Author unknown; "Beyond Fuel Cells," Popular Science, Sep. 1998, p. 44.

Primary Examiner—Stephen Kalafut
Attorney, Agent, or Firm—Heslin & Rothenberg, P.C.

[57] ABSTRACT

An integrated system includes a fuel cell assembly for supplying electrical power to a building, a furnace having a heating chamber and a heat exchanger for supplying heat to the building, and a reformer for providing a supply of reformate directly to the furnace and the fuel cell assembly. The system may include a controller for apportioning the supply of reformate to the fuel cell assembly and to the furnace in response to heating and electrical power needs of the building. In another embodiment, an integrated system includes a fuel cell assembly for providing electrical power to a building, a reformer/furnace unit comprising a chamber and a heat exchanger for providing heat to a building, and wherein fuel is reformed/oxidized in a fuel-rich environment in said chamber to produce a supply of reformate for said fuel cell assembly, and in a fuel-lean environment in said chamber for releasing heat. The system may also include a controller for operating the chamber between a fuel-rich and a fuel-lean environment in response to heating and electrical power needs of the building.

50 Claims, 6 Drawing Sheets

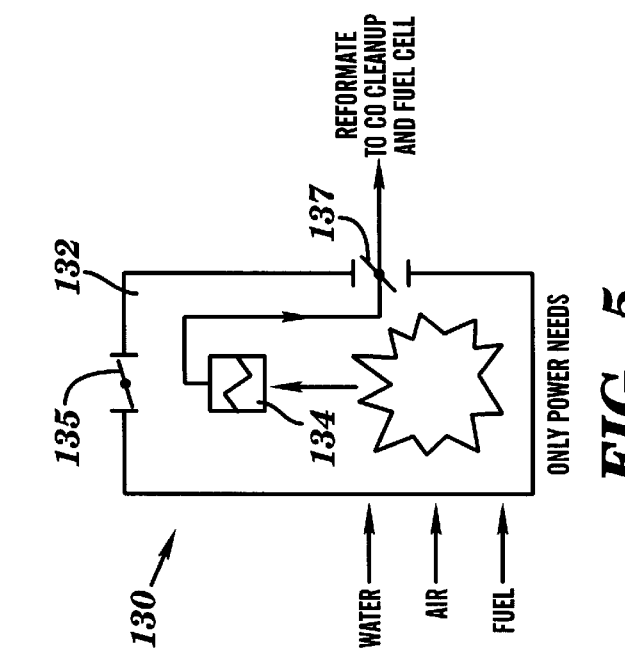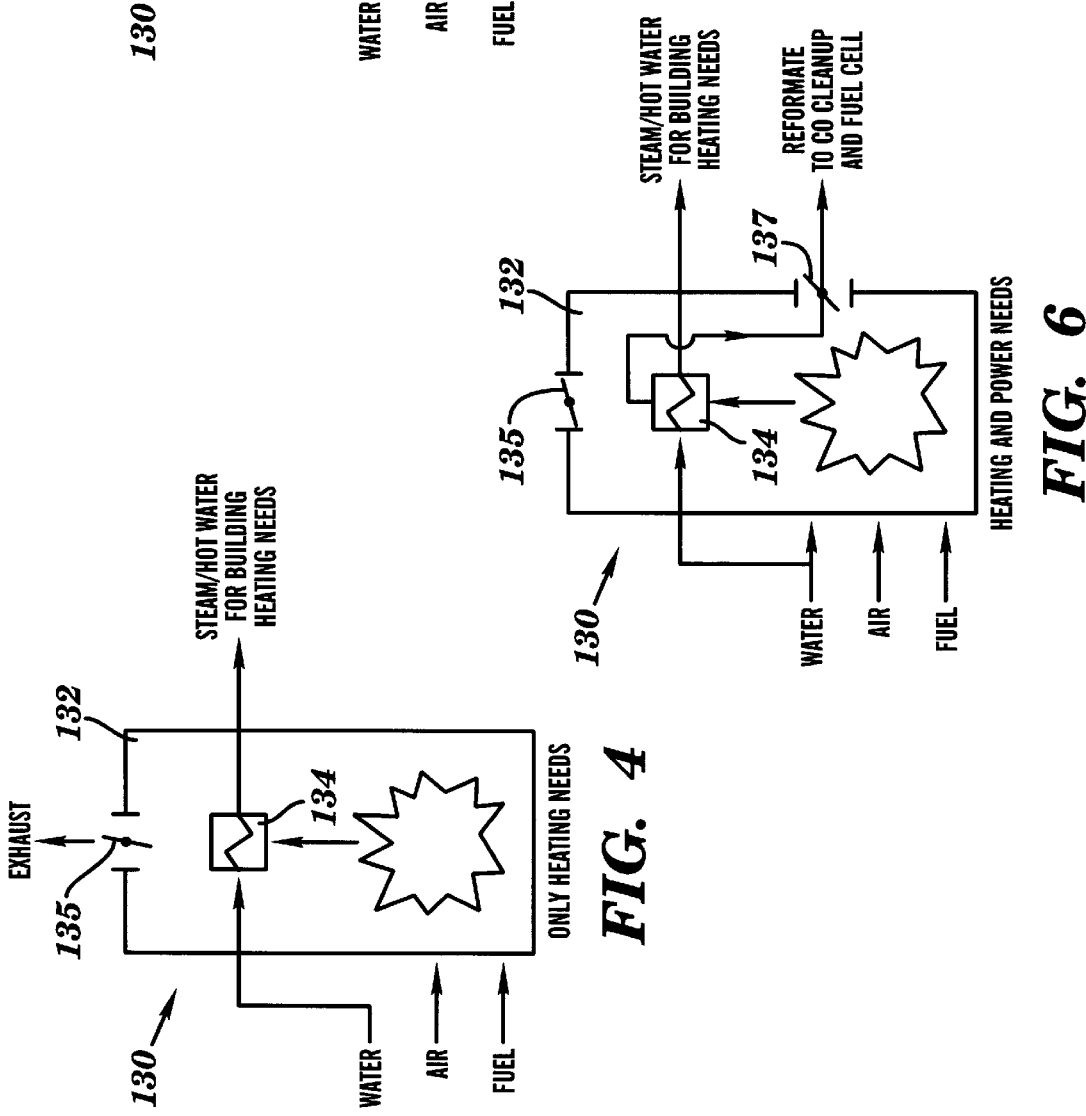

5,985,474

INTEGRATED FULL PROCESSOR, FURNACE, AND FUEL CELL SYSTEM FOR PROVIDING HEAT AND ELECTRICAL POWER TO A BUILDING

TECHNICAL FIELD

This invention relates generally to systems for providing heat and electrical power and, more particularly, to novel integrated systems having a fuel processor, a furnace, and a fuel cell assembly for providing heat, hot water, and/or electrical power to a building.

BACKGROUND INFORMATION

Residential and commercial buildings require heat, hot water, and electrical power. Typically, a furnace or boiler which burns fuel, e.g., oil, natural gas, or propane, will generally provide all of the heating needs in the residential or commercial building. A furnace generally consists of two basic components, a combustion chamber where the fuel is burned, and a heat exchanger where the hot combustion gases transfer heat to a distribution medium, e.g., water, steam, or air. In addition, the furnace, or a separate hot water heater may provide the hot water needs of the residential or commercial building.

Generally, a large, centralized power generation facility provides the electrical power needs of a residential or commercial building.

A fuel cell power system is also capable of providing electrical power. A fuel cell power system generally includes a fuel processor, a fuel cell assembly or stack, and a power conditioner. The fuel processor converts fuel, e.g., natural gas or propane, into a hydrogen-rich gas. The fuel processor generally includes a reformer for processing the fuel into a hydrogen-rich gas or reformate. For fuel cells having a Proton Exchange Membrane, desirably the fuel processor includes a carbon monoxide (CO) cleanup device which reduces the CO content of the reformate.

The fuel cell assembly or stack electrochemically converts hydrogen in the reformate, and oxygen in the oxidant, e.g., air, directly into DC electricity. The power conditioner converts the DC produced by the fuel cell stack to a more useful 120 or 220 VAC.

Attempts have been made for integrating a boiler or furnace with a fuel cell assembly for generating heat and electrical power. For example, U.S. Pat. No. 5,401,589 to Palmer et al. discloses the application of a fuel cell stack to a power generation system in which the waste heat of the system is utilized. For example, heat produced in a fuel cell stack may be used in a reformer or may be used for space heating. In addition, exhaust from a burner of a fuel processor may be connected to a turbine and a small generator to supplement the electrical power output from a fuel cell stack, or coupled with a heat exchanger to provide either process heating or space heating.

U.S. Pat. No. 5,335,628 to Dunbar discloses an integrated boiler/fuel cell system having a water recirculation loop that serves the dual purpose of acting as a cooling agent for a fuel cell and acting as a heat and/or water source for a boiler. Heat from the boiler may be used an energy source to reform natural gas for use in the fuel cell.

U.S. Pat. No. 5,432,710 to Ishimaru et al. discloses an energy supply system having a fuel cell, a reformer for providing a supply of reformate to the fuel cell, a separate boiler, and control means for optimizing energy costs, energy consumption, and emission of pollutants.

The above-noted prior art systems are limited in their integration of the boiler/furnace with a fuel cell power system by operating a reformer to optimize the production of hydrogen-rich reformate and in which the reformate from the reformer is directed solely to a fuel cell assembly.

Therefore, there exists a need for compact integrated systems having a fuel processor, a furnace, and a fuel cell assembly which overcome the limitations of the prior art for efficiently providing heat, hot water, and/or electrical power to a building.

SUMMARY OF THE INVENTION

The shortcomings of the prior art are overcome and additional advantages provided by an integrated system for providing electrical power and heat to a building according to the present invention which in one embodiment, includes a furnace for providing heat, a fuel cell assembly for providing electrical power, and a fuel processor for providing reformate, and wherein the reformate is provided directly to the furnace and/or directly to the fuel cell assembly.

Desirably, the system further includes means for distributing a fuel to the fuel processor, and the reformate to the furnace and/or to the fuel cell assembly in response to heating and electrical power needs in the building.

In another aspect of the present invention, an integrated system for providing heat and electrical power to a building includes a fuel cell assembly for providing electrical power, a reformer/furnace unit comprising a chamber and a heat exchanger for providing heat, and wherein a fuel is selectively reformable at a first fuel-to-air ratio in the chamber to produce a supply of reformate for the fuel cell assembly, and/or in at a second fuel-to-air ratio to release heat. Desirably, the fuel is selectively reformable in response to heating and electrical power needs of the building.

Desirably in the above integrated systems, the fuel cell assembly is a PEM fuel cell assembly, the reformer or reformer/furnace unit includes a partial oxidation reformer, an autothermal catalytic reformer, or a steam reformer, and a power conditioner connected to the fuel cell assembly. The systems may also comprise a second heat exchanger for extracting heat from the supply of reformate to the fuel cell assembly, and a carbon monoxide cleanup device for reducing the amount of carbon monoxide in the supply of reformate to the fuel cell assembly.

The above systems may further include a hot water tank for providing hot water to the building in which the hot water tank is connectable to the fuel cell assembly for cooling the fuel cell assembly and heating water in the hot water tank. Desirably, the hot water tank may include means for humidifying air for the fuel cell assembly.

Another aspect of the present invention provides a method for providing electrical power and heat to a building in which the method includes the steps of reforming a supply of fuel to produce a supply of reformate, and distributing the supply of reformate directly to a furnace for generating heat for a building and directly to a fuel cell assembly for generating electrical power for the building. Desirably, the method comprises the step of apportioning the supply of reformate to the furnace and to the fuel cell assembly and regulating the supply of fuel to be reformed in response to heating and electrical power needs of the building.

A further aspect of the present invention provides a method for providing electrical power and heat to a building in which the method comprises the steps of receiving a supply of fuel, and reforming the supply of fuel at a first fuel to air ratio to produce a supply of reformate for a fuel cell assembly for providing electrical power for the building, and at a second fuel-to-air ratio for producing heat for the building. Desirably, the step of selectively reforming the supply of fuel comprises reforming the fuel at a fuel-to-air ratio between a fuel-rich stoichiometry and a fuel-lean stoichiometry for producing reformate and heat. Advantageously, the method includes the step of controlling the selective reforming of said supply of fuel in response to heating and electrical power needs of the building.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIGS. 4–6 are schematic diagrams of the reformer/furnace unit shown in FIG. 3 for providing heat, reformate, or a combination of heat and reformate, respectively;

DETAILED DESCRIPTION OF THE PREFERRED EMBODIMENTS

The integrated systems according to the present invention may be desirably compactly configured, readily installed in a building, and advantageously operated on a readily available fuel, e.g., natural gas, liquified petroleum gas, methanol, or propane, for providing heat, hot water, and/or electrical power to the building.

For example, the integrated systems may be configured so that reformate produced in a reformer is provided directly to both a furnace and directly to a fuel cell assembly. The integrated systems may also be configured so that a chamber of the reformer and a chamber of the furnace are combined so that a fuel may be selectively burned/reformed in the chamber by varying the fuel/air ratio (e.g., stoichiometry) to provide a maximum release of heat from the fuel, a maximum production of hydrogen rich gas from the fuel, or both release of heat and production of hydrogen gas. Desirably, the operation of the integrated systems is in response to the heat and electrical power needs of the building.

Figure 1:
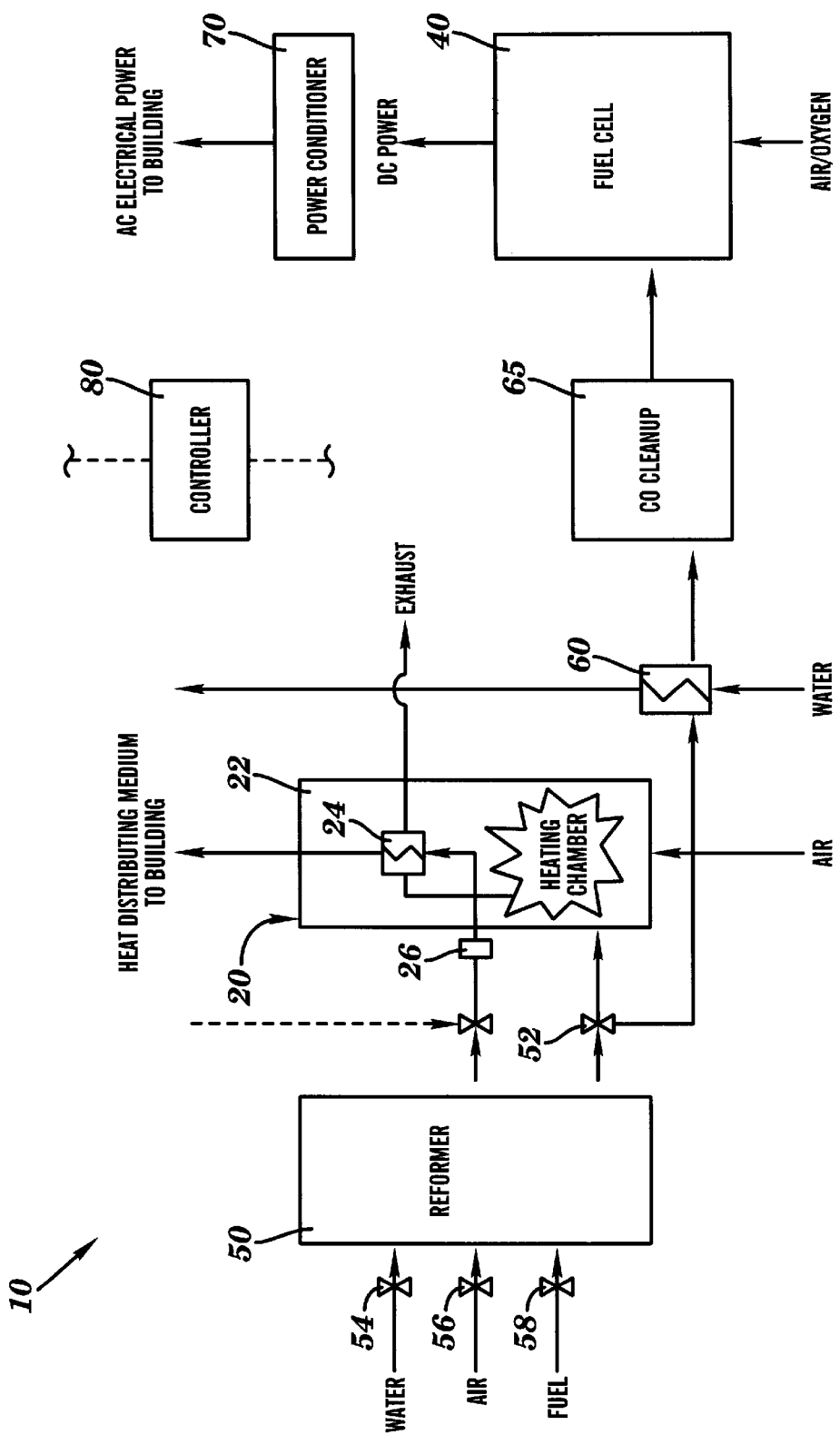
FIG. 1 is a schematic block diagram of one embodiment of an integrated system according to the present invention in which the integrated system includes a fuel processor, a furnace, and a fuel cell assembly for providing heat and electrical power to a building.

FIG. 1 schematically illustrates one embodiment according to the present invention for providing heat, hot water, and electrical power in a building. In this exemplary embodiment, system 10 generally includes a furnace 20 for providing heat, a fuel cell assembly 40 for providing electrical power, and a reformer 50 operably connected to furnace 20 and fuel cell assembly 40 for providing reformate directly to furnace 20, for providing reformate directly to fuel cell assembly 40, or for providing reformate directly to both furnace 20 and fuel cell assembly 40.

Reformer 50 converts fuel (e.g., natural gas from a private or public utility), water (e.g., from a private or public utility) and/or air, into a supply of hydrogen rich gas or reformate. Reformer 50 may be a steam reformer, partial oxidation reformer, a catalytic autothermal reformer or other type reformer.

In a steam reformer, fuel, e.g., natural gas which contains mostly methane ($CH_4$), may be heated and reformed generally as follows:

$$CH_4 + H_2O + Heat \rightarrow 3H_2 + CO$$

A steam reformer requires heat to reform the fuel and typically comprises a combustion chamber. In such a steam reformer, the supply of fuel being reformed is kept separate from combustion gases in the combustion chamber.

In a partial oxidation reformer or catalytic autothermal reformer, natural gas can be partially oxidized generally as follow:

$$CH_4 + \tfrac{1}{2}O_2 + H_2O \rightarrow 3H_2 + CO_2$$

An initial supply of heat for starting the reforming process may be required and provided by initially burning fuel, e.g., natural gas or propane, in a reforming chamber or by indirectly heating the chamber with a heat exchanger, e.g., by using an electrical heater or coil in the reforming chamber. Once the reforming process begins the process produces sufficient heat to continue the process of reforming the fuel. In a partial oxidation reformer or catalytic autothermal reformer the reformate typically has a temperature of greater than about 450 degrees C. Reformate produced by reformer 50 is directly supplied to chamber 22 of furnace 20 and/or to fuel cell 40 via suitable conduits and a three-way valve 52.

Furnace 20 includes a chamber 22 where reformate, as described above, is oxidized with air, and a heat exchanger 24 where the resulting hot gases transfer heat to a distribution medium, e.g., water, steam, or air. In this illustrated embodiment, excess air allows for complete burning of the reformate to increase the total heat release. The distribution medium may be carried to heat-emitting means such as radiators or vents in the building, or to a hot water heater or tank. For example, cold water may be supplied from, e.g., a private or public utility which passes through heat exchanger 24. The heated water may provide the hot water needs of the building on demand or be stored in a hot water tank (not shown in FIG. 1) for use at a later time. Alternatively, the distributing medium, e.g., water, may be contained in a closed loop system, the return portion of which is illustrated in dashed lines. Desirably, in this configuration, a pump or circulator 26 circulates the distributing medium through the closed loop system. It will also be appreciated by those skilled in the art that the heating unit may be a hot water or steam heater, or a draft/forced air heater with a finned heat exchanger.

The hot gases come into contact with heat exchanger 24 after they leave chamber 22 and are then vented to the outside through a stack or chimney of the building. Heat exchanger 24 may be desirably optimized by comprising a large surface area where hot gases on one side transfer heat to the distribution medium on the other side. From the present description, it will be appreciated by those skilled in the art that the heat exchanger may be configured to line, surround, and/or form the heating chamber.

Air required for chamber 22 of furnace 20 may be provided from outside the building rather than from air inside the building. The supply of reformate and the supply of air introduced into chamber 22 may be ignited by a pilot flame or, more economically, by a spark produced by a pair of electrodes. During times of increased demand in the building for heat or hot water, a separate supply of fuel, e.g., natural gas (not shown), may be provided directly to chamber 22 in addition to the reformate.

Fuel cell assembly 40 electrochemically converts a fuel, e.g., reformate, and oxidant, e.g., air or oxygen, directly to electricity. Suitable fuel cell assembly for this invention is of the type having a polymer electrolyte membrane. Other fuel cell assemblies may also be used. A power conditioner 70 is operably connected to fuel cell assembly 40 to convert DC electrical voltage and current from fuel cell assembly 40 to usable AC voltage and current, e.g., at 120 or 220 volts, for use in the building.

Desirably, fuel cell assembly 40 includes a Proton Exchange Membrane (hereinafter "PEM") fuel cell which converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant gases (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

An individual PEM-type fuel cell typically has multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid manifolds. As is known in the art, some of the fluid manifolds distribute fuel (e.g., hydrogen) and oxidants (e.g., air/oxygen) to, and remove unused fuel and oxidants as well as product water from, fluid flow plates which serve as flow field plates of each fuel cell. Also, other fluid manifolds circulate coolant (e.g., water) for cooling.

The PEM can be made using, for instance, a polymer such as the material manufactured by E. I. Du Pont De Nemours Company and sold under the trademark NAFION®. Further, an active electrolyte such as sulfonic acid groups is included in this polymer. In addition, the PEM is available as a product manufactured by W. L. Gore & Associates (Elkton, Md.) and sold under the trademark GORE-SELECT®. Moreover, a catalyst such as platinum which facilitates chemical reactions is applied to each side of the PEM. This unit is commonly referred to as a membrane electrode assembly (hereinafter "MEA"). The MEA is available as a product manufactured by W. L. Gore & Associates and sold under the trade designation PRIMEA 5510-HS.

In a typical PEM-type fuel cell, the MEA is sandwiched between "anode" and "cathode" gas diffusion layers (hereinafter "GDLs") that can be formed from a resilient and conductive material such as carbon fabric or paper. The anode and cathode GDLs serve as electron conductors between catalyzed sites of the PEM and the fuel (e.g., hydrogen) and oxidants (e.g., air/oxygen) which flow in respective "anode" and "cathode" flow channels of respective flow field plates.

With reference still to FIG. 1, reformate is also provided, via three-way valve 52, to a heat exchanger 60 for reducing the temperature of the reformate. The extracted heat from the reformate may be used for providing heat or hot water in the building as described above. From the present description, it will be appreciated by those skilled in the art that the distribution medium heated in heat exchanger 60 may by used separately or operably connected with heat exchanger 24 for providing heat or hot water in the building.

After passing through heat exchanger 60, the reformate having a reduced temperature, e.g., between about 60 degrees C. and about 200 degrees C., passes through a CO cleanup device 65 to reduce the CO content of the reformate to less than about 50 ppm, and preferably between about 10 and about 50 ppm. After reducing the levels of CO in the reformate stream, the reformate is supplied to fuel cell assembly 40. In the exemplary embodiment utilizing a PEM fuel cell, CO clean-up device 65 is desirable. However, in other fuel cells the CO clean-up device may be optional. Air and/or oxygen is also supplied to fuel cell assembly 40 for electrochemical conversion of the reformate and air or oxygen to electrical power, as described above. In addition, an a/c unit, e.g., an expander and a heat exchanger may be disposed between CO clean-up device 65 and fuel cell 40 to further reduce the temperature of the reformate and to condense excess water in the reformate. The excess heat may be used as described above.

System 10 may be readily regulated to efficiently provide adequate supplies of heat, hot water, and/or electrical power to the building. Desirably, system 10 is operated in response to the heating, hot water, and/or electrical power needs of the building. For example, the heating and electrical power needs of the building may be detected and/or determined and, in response thereto, the flow of fuel, air, and water to the reformer, as well as the flow of reformate to either or both furnace 20 and fuel cell assembly 40 may be selectively regulated.

Figure 2:
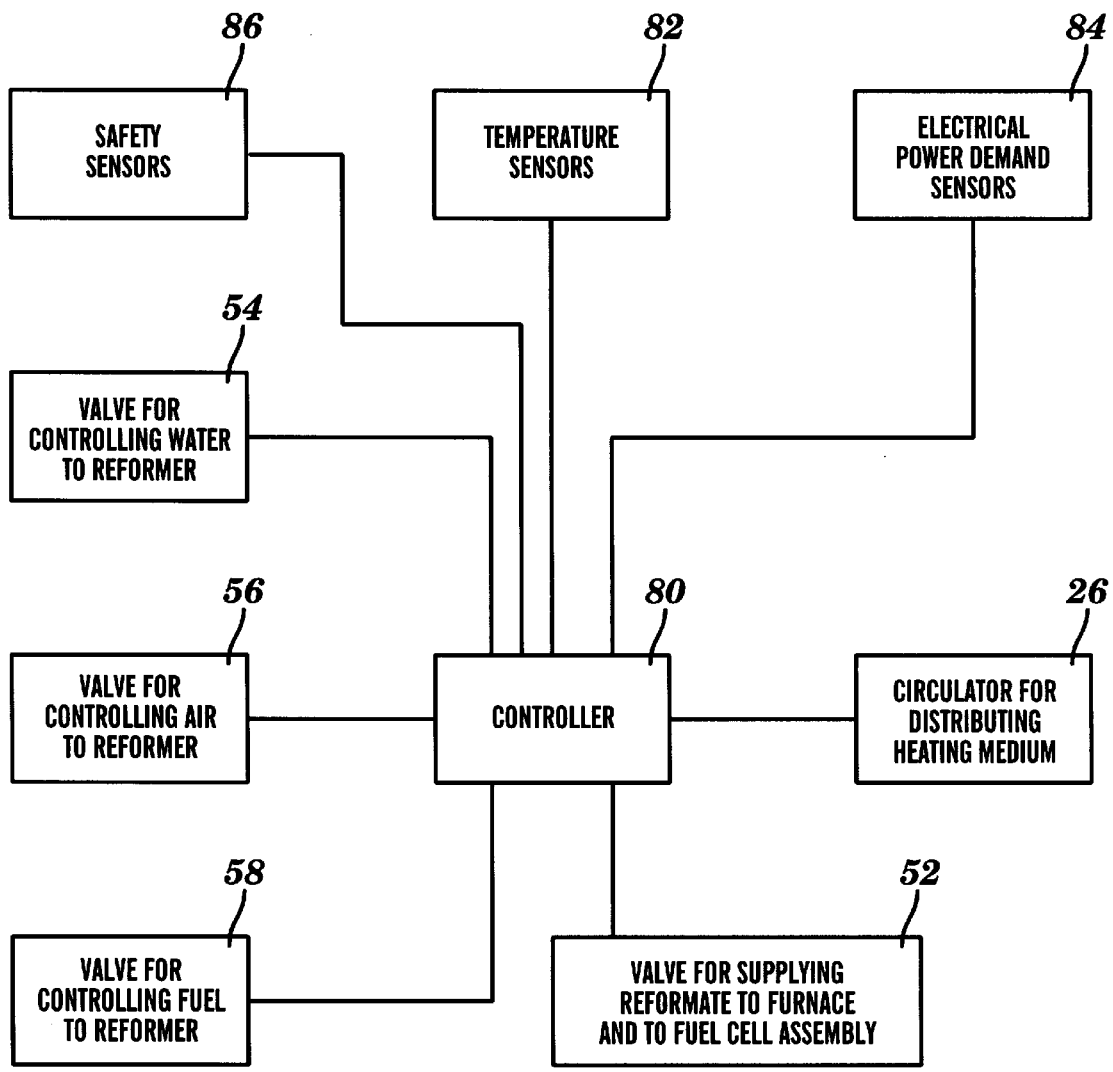
FIG. 2 is a schematic block diagram of the integration of a controller with the integrated system shown in FIG. 1 for controlling the operation of the system.

With reference to FIG. 2, in this illustrated embodiment, a temperature sensor 82, an electrical power demand sensor 84, and safety sensor 86 may provide signals to a controller 80. For example, temperature sensor 82 may comprise one or more thermistors for detecting and/or sensing the temperature in one or more rooms in the building and/or the temperature of water in a hot water heater or tank. Temperature sensors may also include one or more thermostats. Electrical power demand sensor 84 is desirably operably connected to DC to AC inverter 70 for measuring the demand for electrical power. Safety sensor 86 may include building smoke detectors, CO sensors, $H_2$ sensors, and electrical fault detectors.

In one mode of operation of system 10, three controlling inputs or signals may be provided to controller 80, namely, the building temperature, the hot water heater or tank temperature, and the current and/or power required by the house/building. The three input signals are processed to determine the required reformer response. For example, controller 80 may comprise a microprocessor with suitable programming for controlling the operation of system 10 by calculating the inputs of fuel, air, and water required to adequately and efficiently provide the current and/or projected heat, hot water and power requirements of the building.

For example, in response to the input signals, controller 80 may provide output signals to valves 54, 56, 58, and 52 to regulate the flow of water to reformer 20, the flow of air to reformer 20, the flow of fuel to the reformer 20, and the flow of reformate to chamber 22 of furnace 20 and fuel cell assembly 40, respectively. Three-way valve 52 may be selectively operated to direct all the flow of reformate to heating chamber 24, all the flow of reformate to fuel cell assembly 40, or apportion the flow of reformate to heating chamber 24 of furnace 20 and to fuel cell assembly 40.

In this illustrated embodiment, the production of reformate is maximized, and the water and air flows into the reformer are proportionally related to the fuel flow. Each of valves 54, 56, and 58 may be controlled separately, or one of valves 54, 56, and 58 may be controlled with the other two valves being operably connected and responsive to the controlled valve. In addition, controller 80 may also be operable to regulate circulator 26 for circulating the distributing medium, e.g., hot water, through heat exchanger 24.

In an extension of this exemplary embodiment, safety signals from the building, such as smoke detection, CO detectors, and electrical faults, as well as safety signals from the system, such as fuel cell voltage, are monitored by controller 80. In the event of an emergency, the controller may take appropriate action, e.g., corrective action or controlled shutdown.

From the present description, it will be appreciated by those skilled in the art that a system of mechanical relays, valves, and switches may be operably configured to regulate the operation of system 10 in response to the heating, hot water, and electrical needs of the building. In addition, it will be appreciated that instead of valves, variable speed pumps and/or blowers may also be suitable for regulation of system 10, e.g., for controlling the flow of fuel and reformate.

Figure 3:
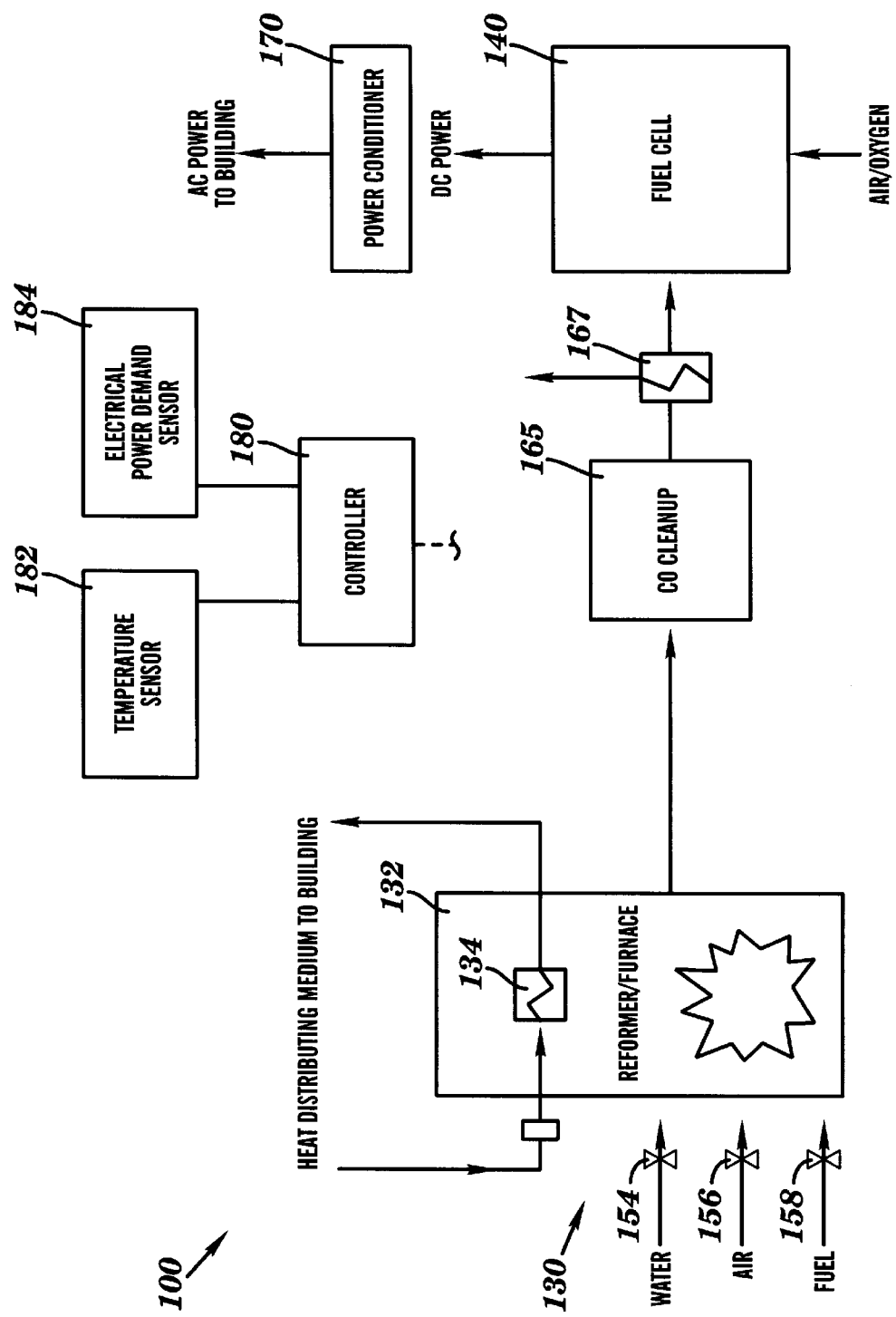
FIG. 3 is a schematic block diagram of an alternative embodiment of an integrated system according to the present invention in which the integrated system includes a reformer/furnace unit and a fuel cell assembly for providing heat and electrical power to a building.

FIG. 3 schematically illustrates an alternative embodiment according to the present invention for providing heat (e.g., space heating and/or hot water) and electrical power to a building. In this exemplary embodiment, system 100 generally comprises a fuel cell assembly 140 for providing electrical power to the building, and a reformer/furnace unit 130 for providing heat to the building and for reforming fuel for fuel cell assembly 140.

Reformer/furnace unit 130 includes a chamber 132 and a heat exchanger 134. Chamber 132 is desirably configured and operable as a combined combustion chamber and a partial oxidation reformer, a catalytic autothermal reformer or other type reformer. Heat exchanger 134 is operable for transferring heat from the hot gases to a distribution medium, e.g., water, steam, or air, which may be carried to heat-emitting means such as radiators or vents in the building, or to a hot water heater or tank, as described above. The hot gases may be vented to the outside through a stack or chimney of the building and/or directed to a CO cleanup device 165. Desirably, the heat exchanger may be configured to line, surround, and/or form the chamber.

Reformate, from CO cleanup device 165 having a reduced CO level, is supplied to fuel cell assembly 140. An a/c unit 167, e.g., having an expander and a heat exchanger may be disposed between CO clean-up device 165 and fuel cell 140 to reduce the temperature of the reformate to between about 80 degrees C. to about 100 degrees C. and to condense excess water in the reformate. A power conditioner 170 is operably connected to fuel cell assembly 140. Desirably, fuel cell assembly 140 is a PEM fuel cell assembly.

System 100 may be readily regulated to efficiently provide adequate supplies of heat, hot water, and/or electrical power to the building. Desirably, system 100 is operable in response to the heating, hot water, and/or electrical power needs of the building. For example, the heating and electrical power needs of the building may be detected and/or determined and, in response thereto, the flow of fuel, air, and water to the reformer may be selectively regulated.

System 100 may be regulated to efficiently provide adequate supplies of heat and electrical power to the building by operation of a controller and a plurality of sensors and valves. For example, a controller 180 may include a microprocessor for sensing or monitoring the heating and electrical power needs, via sensors 182 and 184, of the building, and in response thereto, for regulating the supply of water, air, and fuel to chamber 132 via valves 154, 156, and 158, respectively. In this illustrated embodiment, the fuel flow, the air flow, and the water flow to chamber 142 of reformer/furnace 130 are not regulated in a proportional or fixed relation with respect to each other, but are varied as determined by controller 180 as explained below. From the present description, it will be appreciated by those skilled in the art that a system of mechanical relays, valves, and switches may also be operably configured to regulate the operation of system 100 in response to the heating, hot water, and electrical power needs of the building. In addition, it will be appreciated that instead of valves, variable speed pumps and/or blowers may also be suitable for regulation of system 100, e.g., for controlling the flow of air, fuel and reformate.

With reference to FIGS. 4–6, the operation of chamber 132 may be varied in response to the heating and electrical power needs of the building. As shown in FIG. 4, at a very fuel-lean stoichiometry (fuel to air ratio, e.g., phi<1), chamber 132 may be operated as an efficient burner for heating the building. For example, in chamber 132, natural gas which contains mostly methane, may be completely combusted to maximize the release of heat generally as follow:

$$CH_4 + 2O_2 \rightarrow CO_2 + 2H_2O + \text{Heat}$$

The hot gases come into contact with heat exchanger 134 after they leave chamber 132 and are then vented through a damper 135 to the outside through a stack or chimney of the building.

As shown in FIG. 5, chamber 132 may also be operated in a very fuel-rich stoichiometry (e.g., phi=4) so that chamber 132 acts as an efficient reformer for the production of a hydrogen rich gas which passes through a damper 137 (damper 135 being closed) to CO cleanup device 165 (FIG. 3) and then to fuel cell assembly 140 (FIG. 3). For example, reformer/furnace unit 130 is operable to reform the fuel to generally maximize the production of hydrogen gas for operating the fuel cell assembly generally as follows:

$$CH_4 + \tfrac{1}{2}O_2 + H_2O \rightarrow 3H_2 + CO_2$$

In this case, heat exchanger 134 may also be used to extract heat from the reformate which is distributed to the building. Alternatively, a separate heat exchanger for reducing the heat of the reformate may be disposed between the reformer/furnace 130 and CO cleanup device 165 (FIG. 3).

As shown in FIG. 6, if the building requires both heat and electrical power, chamber 132 may be efficiently operated between a very fuel-lean stoichiometry (phi<1) and a very fuel-rich stoichiometry (phi=4). For example, at a phi=2, chamber 132 is operable at higher temperature for providing heat compared to maximizing the supply of hydrogen gas while still producing sufficient hydrogen gas for fuel cell assembly 140 (FIG. 3) for providing electrical power. In this situation, chamber 132 is operable generally as follows:

$2CH_4 + 2O_2 + H_2O \rightarrow CO + CO_2 + 2H_2O + 3H_2 + Heat$

Figure 7:
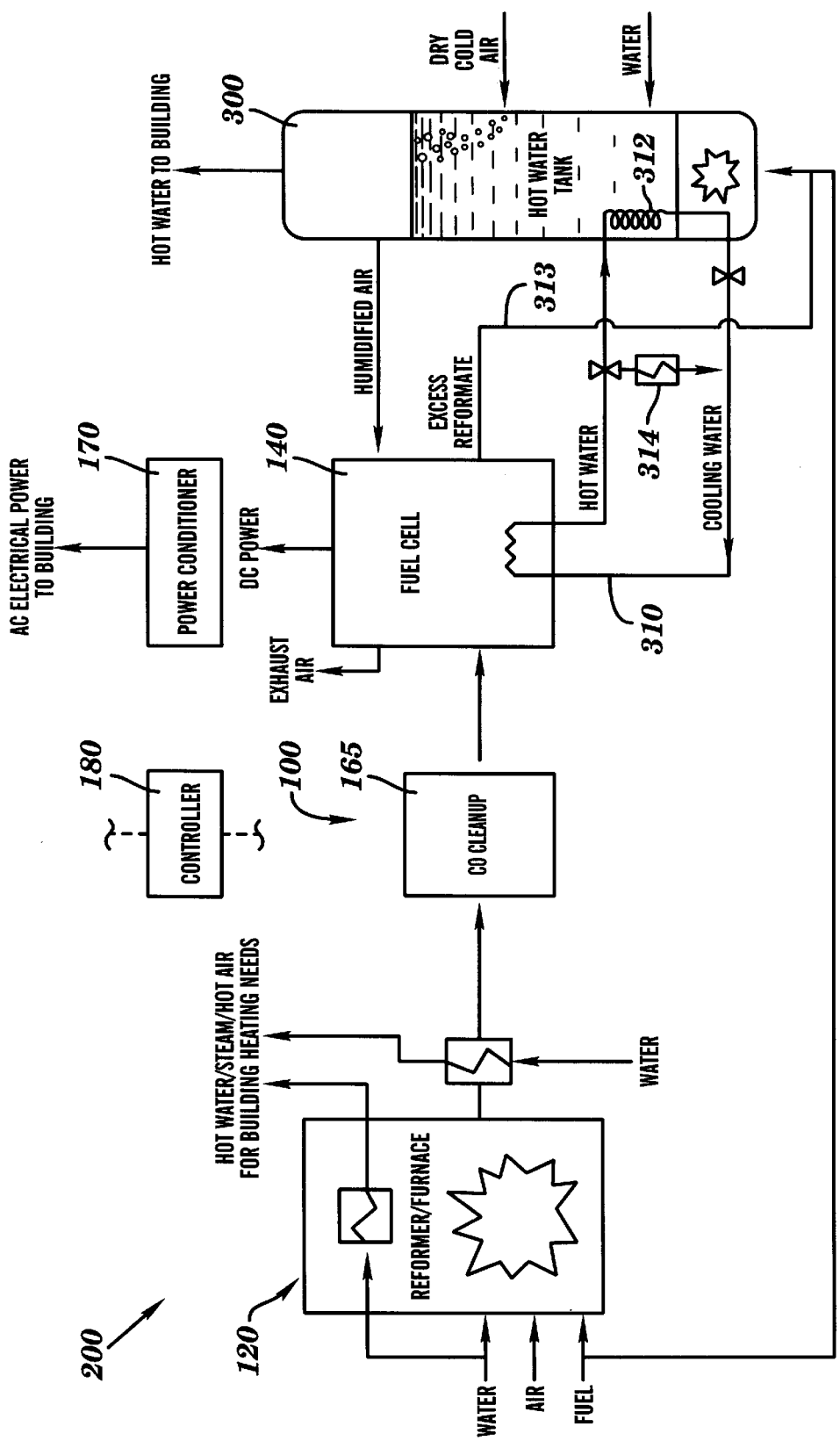
FIG. 7 is a schematic block diagram of an alternative embodiment of an integrated system according to the present invention in which the integrated system includes a reformer/furnace unit, a fuel cell assembly, and a hot water tank/heater for providing heat, hot water, and electrical power to a building.

FIG. 7 schematically illustrates a further embodiment according to the present invention for an integrated system for providing heat (e.g., space heating and/or hot water) and electrical power to a building. In this exemplary embodiment, system 200 essentially comprises system 100 with the addition of a hot water tank 300 for supplying hot water to the building. Hot water tank 300 is operably connected to fuel cell assembly 140 for cooling fuel cell assembly 140 and/or for providing humidified air to fuel cell assembly 140.

For example, a cooling loop 310 may circulate cooling water through fuel cell assembly 140, the water which after being heated by fuel cell assembly 140, can be used for heating or supplementing the heating of water in hot water tank 300 by passing through a heat exchanger or coil 312. In times of increased demand for hot water, a separate supply of fuel may be burned to provide heat for heating water in the hot water tank 300. In addition, excess reformate exhausted from fuel cell assembly 140, e.g., along line 313, may also be burned to provide heat for heating water in hot water tank 300.

A heat exchanger 314 may be operably connected between the cold water feed and the hot water return so that the cooling water bypasses hot water tank 300, e.g., where the hot water tank is at a desired heated temperature and additional heat is not required.

In addition, hot water tank 300 may be operably connected to fuel cell assembly 140 for supplying a humidified reactant gas, e.g., air, to fuel cell assembly 140. For example, cold dry air may be introduced and bubbled through the hot water stored in hot water tank 300 to produce a humidified and heated supply of air to the cathode side of fuel cell assembly 140.

Figure 8:
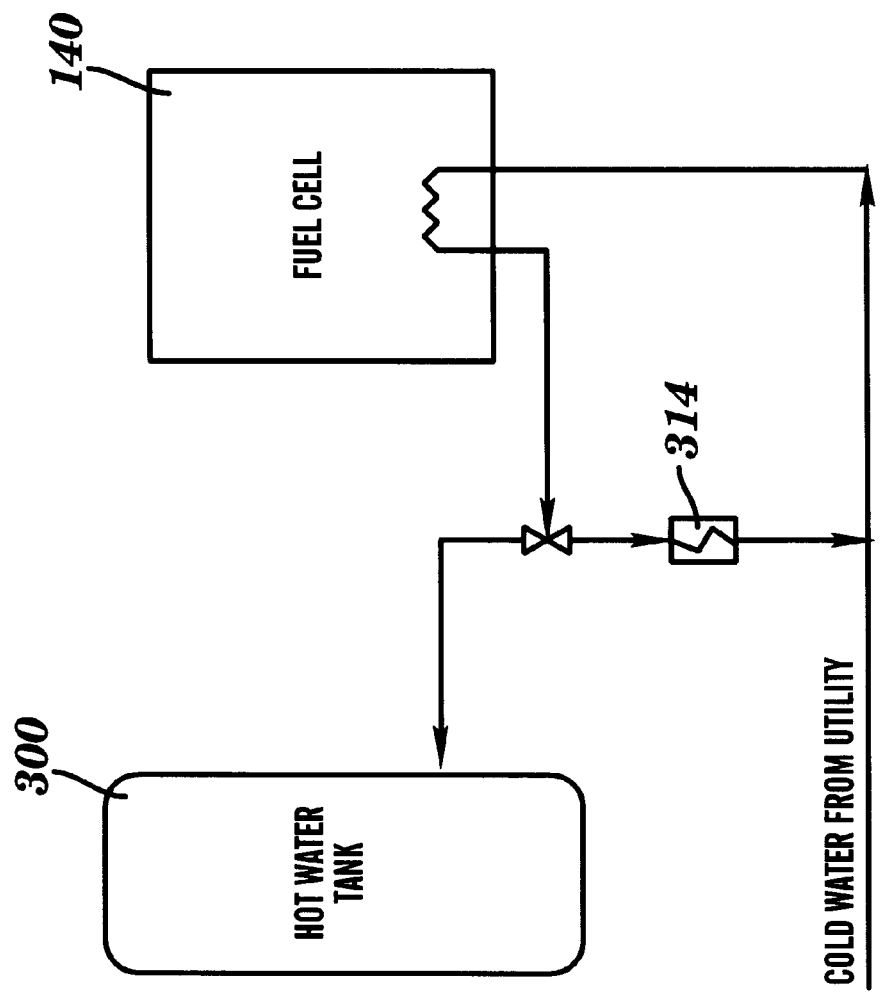
FIG. 8 is a schematic block diagram of an alternative configuration for integrating of the fuel cell assembly with the water tank/heater shown in FIG. 7.

FIG. 8 illustrates an alternative configuration for integrating the fuel cell assembly 140 of system 100 with a hot water tank 300. In this configuration, the supply of cold water from a municipal water supply is fed directly to fuel cell assembly 140, the heated water output of which is directly fed and introduced into hot water tank 300 for storage and supply of hot water to the building. A heat exchanger 314 may be operably connected between the cold water feed and the hot water return to bypass the hot water tank 300, e.g., where water in hot water tank 300 is at a desired heated temperature and additional heat is not needed. It will be appreciated that water from the municipal water supply may also be fed directly to the hot water tank in addition to the supply of cooling water from the fuel cell assembly. In addition, it will be appreciated that heated water from the fuel cell may be supplied to reformer/furnace unit 120 (FIG. 7).

From the present description, it will also be appreciated by those skilled in the art that system 10 may be operably connected to a hot water tank/heater as described above with respect to system 100.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

We claim:

1. A system for providing heat and electrical power to a building, said system comprising:

a furnace for providing heat;

a fuel cell assembly for providing electrical power;

a reformer for providing reformate, and wherein the reformate is provided directly to said furnace and directly to said fuel cell assembly.

2. The system according to claim 1, further comprising means for distributing the reformate to said furnace and to said fuel cell assembly in response to heating and electrical power needs, respectively, in the building.

3. The system according to claim 2, wherein said means for distributing is operable for distributing a fuel to said reformer in response to heating and electrical power needs in the building.

4. The system according to claim 1, further comprising a controller for distributing fuel to said reformer, and reformate to said furnace and to said fuel cell assembly in response to heating and electrical power needs of the building.

5. The system according to claim 4, further comprising a valve operably connected to said controller for controlling a supply of reformate to said furnace and to said fuel cell assembly.

6. The system according to claim 5, further comprising a valve operably connected to said controller for controlling a supply of fuel to said reformer.

7. The system according to claim 6, further comprising temperature and electrical sensors connectable to said controller.

8. The system according to claim 7, further comprising safety sensors connectable to said controller.

9. The system according to claim 1, wherein said fuel cell assembly comprises a PEM fuel cell assembly.

10. The system according to claim 9, further comprising a power conditioner operably connected to said fuel cell assembly.

11. The system according to claim 1, wherein said reformer comprises a partial oxidation reformer.

12. The system according to claim 1, wherein said reformer comprises an autothermal catalytic reformer.

13. The system according to claim 1, wherein said reformer comprises a steam reformer.

14. The system according to claim 1, wherein said fuel comprises a fuel selected from the group consisting of natural gas, liquified petroleum gas, and methanol.

15. The system according to claim 1, further comprising a heat exchanger for extracting heat from the reformate provided to said fuel cell assembly, and a carbon monoxide cleanup device for reducing the amount of carbon monoxide in the reformate.

16. The system according to claim 1, further comprising a hot water tank for providing hot water to the building, and said hot water tank connectable to said fuel cell assembly for cooling said fuel cell assembly and heating water in said hot water tank.

17. The system according to claim 16, wherein a supply of water for the building passes through said fuel cell assembly.

18. The system according to claim 16, wherein said hot water tank comprises means for humidifying air for said fuel cell assembly.

19. A system for providing heat and electrical power to a building, said system comprising:

a fuel cell assembly for providing electrical power;

a reformer/furnace unit comprising a chamber and a heat exchanger for providing heat; and wherein a fuel is selectively reformable in said chamber at a first fuel-to-air ratio in said chamber to produce a supply of reformate for said fuel cell assembly, and at a second fuel-to-air ratio in said chamber to release heat.

20. The system according to claim 19, wherein said first fuel-to-air ratio comprises a fuel-lean stoichiometry and said second fuel-to-air ratio comprises a fuel-lean stoichiometry.

21. The system according to claim 19, wherein fuel is reformable at fuel-to-air ration between a fuel-rich stoichiometry and a fuel-lean stoichiometry for providing reformate and releasing heat.

22. The system according to claim 19, wherein fuel is selectively reformable in response to heating and electrical power needs of the building.

23. The system according to claim 19, further comprising means for selectively reforming the fuel in response to said heating and electrical power needs of said building.

24. The system according to claim 19, further comprising a controller for controlling supplies of fuel and air to said chamber in response to heating and electrical power needs of the building.

25. The system according to claim 24, further comprising a plurality of valves operably connected to said chamber and to said controller for separately regulating the supplies of fuel and air to said chamber.

26. The system according to claim 23, further comprising temperature and electrical sensors connectable to said controller.

27. The system according to claim 26, further comprising safety sensors connectable to said controller.

28. The system according to claim 19, wherein said fuel cell assembly comprises a PEM fuel cell assembly.

29. The system according to claim 19, further comprising a power conditioner connected to said fuel cell assembly.

30. The system according to claim 19, wherein said fuel comprises a fuel selected from the group consisting of natural gas, liquefied petroleum gas, and methanol.

31. The system according to claim 19, wherein said heat exchanger defines said chamber of said furnace.

32. The system according to claim 19, further comprising a hot water tank for providing hot water to the building, and said hot water tank connectable to said fuel cell assembly for cooling said fuel cell assembly and heating water in said hot water tank.

33. The system according to claim 32, wherein a supply of water for said hot water tank passes through said fuel cell assembly.

34. The system according to claim 32, wherein said hot water tank comprises means for humidifying a supply of air for said fuel cell assembly.

35. A combination fuel cell assembly and hot water tank for providing electrical power and domestic hot water to a building, said combination fuel cell assembly and hot water tank comprising:
a fuel cell assembly for providing electrical power to the building;
a hot water tank into which is receivable and in which is heatable a supply of cold water to supply domestic hot water to the building; and
means for exchanging heat from said fuel cell assembly to the supply of cold water in said hot water tank.

36. The combination fuel cell assembly and hot water tank according to claim 35, wherein said means for exchanging heat comprises means for passing a supply of water through said fuel cell assembly and into said hot water tank.

37. The combination fuel cell assembly and hot water tank according to claim 35, wherein said hot water tank comprises means for humidifying a supply of air for said fuel cell assembly.

38. The combination fuel cell assembly and hot water tank according to claim 35 wherein the hot water tank comprises means for connecting to a municipal water supply.

39. A method for providing heat and electrical power to a building, the method comprising the steps of:
reforming a supply of fuel to produce a supply of reformate; and
distributing said supply of reformate directly to a furnace for providing heat for said building and directly to a fuel cell assembly for providing electrical power for said building.

40. The method according to claim 39, wherein said step of distributing said reformate comprises apportioning said supply of reformate to said furnace and to said fuel cell assembly in response to heating and electrical power needs of said building.

41. The method according to claim 39, further comprising the step of regulating said supply of fuel in response to said heating and electrical power needs of said building.

42. The method according to claim 39, wherein said fuel cell assembly comprise a PEM fuel cell assembly.

43. The method according to claim 39, wherein said fuel comprises a fuel selected from the group consisting of natural gas, liquefied petroleum gas, and methanol.

44. A method for providing electrical power and heat to a building, the method comprising the steps of:
receiving a supply of fuel; and
selectively reforming said supply of fuel at a first fuel-to-air ratio in a chamber to produce a supply of reformate for a fuel cell assembly for providing electrical power for the building, and at a second fuel-to-air ratio in the chamber for producing heat for the building.

45. The method according to claim 44, wherein said step of selectively reforming said supply of fuel comprises reforming said fuel at a fuel to air ratio between a fuel-rich stoichiometry and a fuel-lean stoichiometry for producing reformate and heat.

46. The method according to claim 44, further comprising the step of controlling the selective reforming of the said supply of fuel in response to heating and electrical needs of said building.

47. The method according to claim 44, wherein said fuel comprises a fuel selected from the group consisting of natural gas, liquefied petroleum gas, and methanol.

48. The method according to claim 44, wherein said fuel cell assembly comprises a PEM fuel cell assembly.

49. A system for providing electricity to a building, said system comprising:
a fuel cell assembly;
a reformer for providing reformate to said fuel cell assembly; and
at least one of an electrical power demand sensor, a temperature sensor, a smoke detector, and a gas detector disposed in the building and connected to effect operation of at least one of said reformer and said fuel cell.

50. A method for providing electrical power and domestic hot water to a building, the method comprising:
providing a fuel cell assembly for providing electrical power to the building;
providing a hot water tank into which is receivable a supply of cold water;
exchanging heat from the fuel cell assembly to the supply of cold water in said hot water tank to produce a heated supply of water; and
supplying the heated supply of water as domestic hot water to the building.

* * * * *